US011721189B2

(12) United States Patent
Pace et al.

(10) Patent No.: US 11,721,189 B2
(45) Date of Patent: Aug. 8, 2023

(54) ASPIRATING SMOKE DETECTOR DEVICE

(71) Applicant: Honeywell International Inc., Charlotte, NC (US)

(72) Inventors: Gianluca Pace, Trieste (IT); Domenico Piro, Trieste (IT); Mauro Miheli, Trieste (IT)

(73) Assignee: Honeywell International Inc., Charlotte, NC (US)

( * ) Notice: Subject to any disclaimer, the term of this patent is extended or adjusted under 35 U.S.C. 154(b) by 227 days.

(21) Appl. No.: 17/335,634

(22) Filed: Jun. 1, 2021

(65) Prior Publication Data

US 2022/0383720 A1 Dec. 1, 2022

(51) Int. Cl.
*G08B 17/10* (2006.01)
*G01F 1/66* (2022.01)
*G01N 15/06* (2006.01)
*G08B 25/10* (2006.01)
*G01N 15/00* (2006.01)

(52) U.S. Cl.
CPC ............. *G08B 17/10* (2013.01); *G01F 1/662* (2013.01); *G01N 15/06* (2013.01); *G08B 25/10* (2013.01); *G01N 2015/0046* (2013.01)

(58) Field of Classification Search
CPC .............................. G01F 1/662; G01N 15/06; G01N 2015/0046; G08B 25/10; G08B 17/10
USPC ......................................................... 73/28.01
See application file for complete search history.

(56) References Cited

U.S. PATENT DOCUMENTS

| | | |
|---|---|---|
| 6,720,886 B2 | 4/2004 | Seelbach et al. |
| 9,134,716 B2 | 9/2015 | Cole et al. |
| 9,824,564 B2 | 11/2017 | Bressanutti et al. |
| 10,115,280 B2 | 10/2018 | Bressanutti et al. |
| 10,877,011 B2 | 12/2020 | Cummings et al. |
| 2007/0029477 A1* | 2/2007 | Miller ................ G01N 30/7206 250/290 |
| 2017/0082116 A1* | 3/2017 | Nibu ......................... H01B 7/00 |
| 2020/0116688 A1 | 4/2020 | Bertini et al. |
| 2020/0271565 A1* | 8/2020 | Gütle et al. .......... G01N 1/2273 |

FOREIGN PATENT DOCUMENTS

| | | |
|---|---|---|
| CN | 1256411 | 6/2000 |
| CN | 110613912 A | 12/2019 |
| DE | 19605637 C1 | 5/1997 |
| DE | 10114729 A1 | 10/2002 |
| EP | 0774742 A2 | 5/1997 |
| EP | 0696787 | 6/1999 |
| WO | 2008109933 A1 | 9/2008 |

* cited by examiner

Primary Examiner — Nathaniel T Woodward
(74) Attorney, Agent, or Firm — Brooks, Cameron & Huebsch, PLLC

(57) ABSTRACT

Devices, systems, and methods for an aspirating smoke detector device are described herein. In some examples, one or more embodiments include an aspirating smoke detector device comprising a printed circuit board (PCB), a manifold including a first flow channel and a second flow channel, a blower housing configured to receive a blower, a first sensor head housing connected to the blower housing via the first flow channel, wherein the first sensor head housing is configured to receive a first sensor head, and a second sensor head housing connected to the blower housing via the second flow channel, wherein the second sensor head housing is configured to receive a second sensor head, and a gasket configured to fluidically seal the manifold to the PCB.

20 Claims, 10 Drawing Sheets

ASPIRATING SMOKE DETECTOR DEVICE

TECHNICAL FIELD

The present disclosure relates to devices, systems, and methods for an aspirating smoke detector device.

BACKGROUND

Large facilities (e.g., buildings), such as commercial facilities, office buildings, hospitals, and the like, may have an alarm system that can be triggered during an emergency situation (e.g., a fire) to warn occupants to evacuate. For example, an alarm system may include a control panel (e.g., a fire control panel) and a plurality of aspirating smoke detector devices located throughout the facility (e.g., on different floors and/or in different rooms of the facility) that detect a hazard event, such as smoke generation (e.g., as the result of a fire or otherwise). The aspirating smoke detector can transmit a signal to the control panel in order to notify a building manager, occupants of the facility, emergency services, and/or others of the hazard event via alarms or other mechanisms.

DETAILED DESCRIPTION

Figure 1:
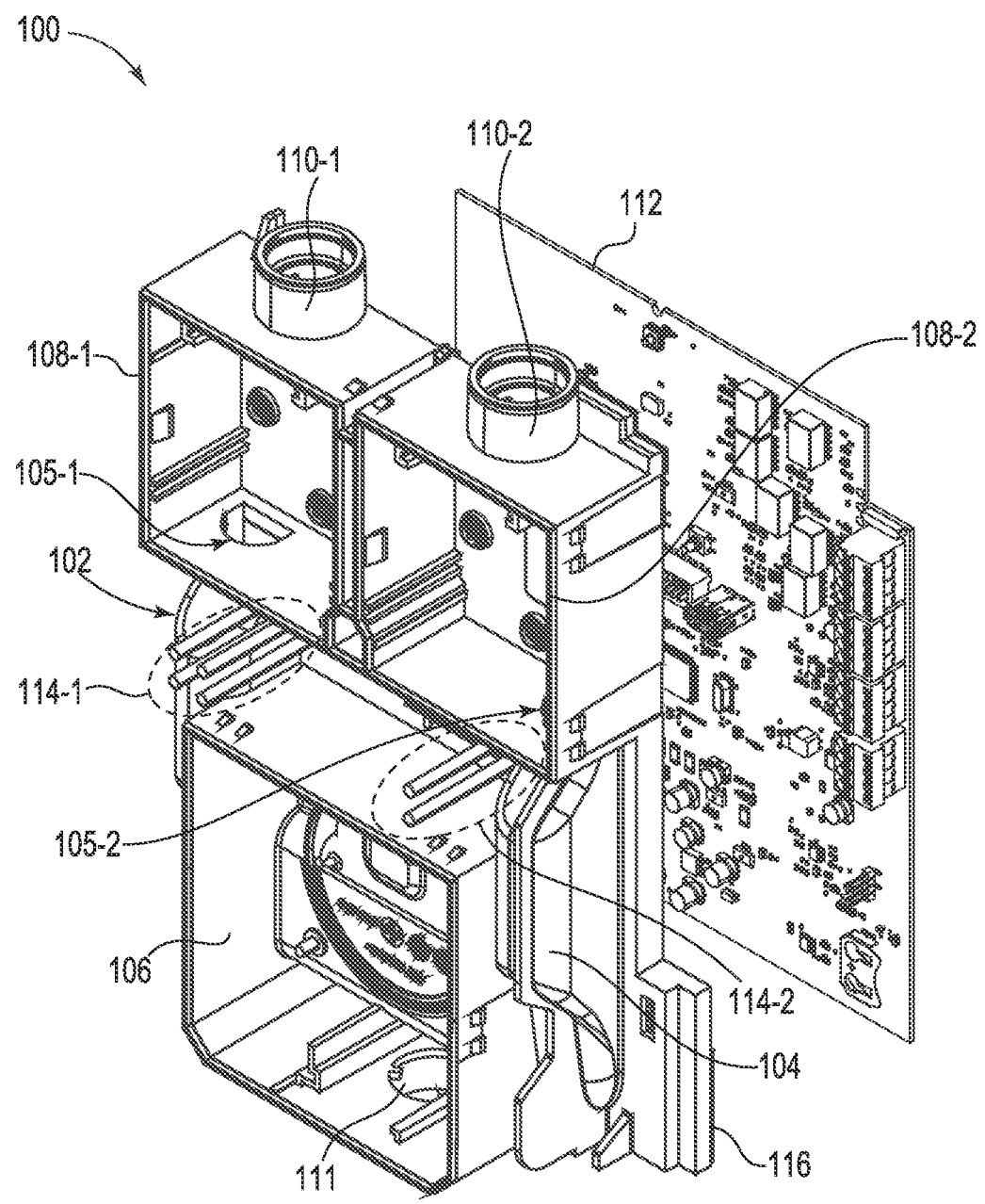
FIG. 1 is an exploded view of an example of a portion of an aspirating smoke detector device, in accordance with one or more embodiments of the present disclosure.

Devices, systems, and methods for an aspirating smoke detector device are described herein. In some examples, one or more embodiments include an aspirating smoke detector device comprising a printed circuit board (PCB), a manifold including a first flow channel and a second flow channel, a blower housing configured to receive a blower, a first sensor head housing connected to the blower housing via the first flow channel, wherein the first sensor head housing is configured to receive a first sensor head, and a second sensor head housing connected to the blower housing via the second flow channel, wherein the second sensor head housing is configured to receive a second sensor head, and a gasket configured to fluidically seal the manifold to the PCB.

An aspirating smoke detector device can be utilized in a facility to detect a hazard event by detecting the presence of smoke. The aspirating smoke detector device can draw gas (e.g., air, via a blower) from the facility into a sensor through a network of pipes throughout the facility. The sensor can sample the gas in order to determine whether the gas includes smoke particles. In response to detection of smoke particles, the aspirating smoke detector device can transmit a signal to a control panel in the facility to signal detection of smoke particles.

However, aspirating smoke detector devices may be difficult to assemble and/or install. For example, assembling an aspirating smoke detector device may require assembly of a blower, a sensor head, and/or other components by utilizing a tool to engage with bolts, screws, or other fasteners. Such a design may result in a cumbersome assembly process, which can result in increases in assembly time for the aspirating smoke detector device.

An aspirating smoke detector device according to the present disclosure can allow for a compact and modular aspirating smoke detector device that can be lower cost and easier to assemble as compared with previous approaches. For example, an aspirating smoke detector device according to the present disclosure can allow for tool-less assembly without the need for fasteners, which can result in decreased assembly time and lower assembly cost as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an exploded view of an example of a portion of an aspirating smoke detector device 100, in accordance with one or more embodiments of the present disclosure. The aspirating smoke detector device 100 can include a manifold 102 and a PCB 112.

As illustrated in FIG. 1, the aspirating smoke detector device 100 can include a printed circuit board (PCB) 112. As used herein, the term "PCB" refers to a device to mechanically support and electrically connect electrical components via conductive traces. The PCB 112 can, therefore, include electrical components utilized in detection of smoke via the aspirating smoke detector device 100. For example, although not illustrated in FIG. 1 for clarity and so as not to obscure embodiments of the present disclosure, the aspirating smoke detector device 100 can include a blower and sensor head housings. The PCB 112 can be utilized to control the blower (e.g., the speed of the blower), receive signals from the sensor head housings, etc. The PCB 112 can, accordingly, be utilized to control operation of the aspirating smoke detector device 100 to detect smoke particles in a gas flowing through the aspirating smoke detector device 100 and transmit a signal to a control panel in response to detection of smoke particles in the gas. The PCB 112 can include buttons (e.g., not illustrated in FIG. 1), light emitting diodes (LEDs), as are further described in connection with FIG. 6, among other electrical components.

As shown in the exploded view of FIG. 1, the aspirating smoke detector device 100 can further include a manifold 102. As used herein, the term "manifold" refers to a device including at least one inlet and at least one outlet. For example, the manifold 102 can make up a portion of the aspirating smoke detector device 100 and can include various parts, including a flow path 104, a blower housing 106, a first sensor head housing 108-1, and a second sensor head housing 108-2, as are further described herein.

The manifold 102 can be manufactured of a plastic material. For example, the manifold 102 can be manufactured from acrylonitrile butadiene styrene (ABS) plastic, poly(methyl methacrylate) (PMMA) plastic, thermoplastic elastomers (TPE), among other types of plastic materials. Further, the manifold 102 can be made of any other type of material (e.g., metal, carbon fiber, etc.). The manifold 102 can be manufactured via multi-shot molding techniques, among other manufacturing techniques, as is further described in connection with FIG. 10.

A flow path 104 can be included as part of the manifold 102. The flow path 104 can include a first flow channel 105-1 and a second flow channel 105-2 (referred to collectively herein as flow channels 105). The flow channels 105 can allow for the flow of gas through the aspirating smoke detector device 100. For instance, gas can flow into and out of different portions of the aspirating smoke detector device 100 through the flow channels 105 for smoke detection, as is further described herein.

The manifold 102 can include light pipes 114-1 and 114-2. As used herein, the term "light pipe" refers to a device to transmit light for the purpose of illumination. The light pipes 114 can be of a transparent material to allow light (e.g., from an LED of the PCB 112) to be transmitted, as is further described in connection with FIGS. 6 and 8. The light pipes 114-1 can be in a 2×2 array configuration and the light pipes 114-2 can be in a 2×1 array configuration.

The manifold 102 can include a blower housing 106. The blower housing 106 can be configured to receive a blower (e.g., not illustrated in FIG. 1). The blower can operate to draw gas into and cause gas to flow through the aspirating smoke detector device 100. The blower housing 106 can include a blower housing outlet 111. The gas flowing through the aspirating smoke detector device 100 can exit the aspirating smoke detector device through the blower housing outlet 111.

The first flow channel 105-1 can connect the blower housing 106 to a first sensor head housing 108-1. The first sensor head housing 108-1 can be configured to receive a sensor head (e.g., not illustrated in FIG. 1). The first sensor head housing 108-1 can include a first sensor head housing inlet 110-1. The blower can operate to draw gas into a sensor head located in the first sensor head housing 108-1 via the first sensor head housing inlet 110-1 and out of the first sensor head housing 108-1 via the first flow channel 105-1 for detection of smoke particles in the gas.

Similar to the first flow channel 105-1, the second flow channel 105-2 can connect the blower housing 106 to a second sensor head housing 108-2. The second sensor head housing 108-2 can also be configured to receive a sensor head (e.g., not illustrated in FIG. 1). The second sensor head housing 108-2 can include a second sensor head housing inlet 110-2. The blower can operate to draw gas into another sensor head located in the second sensor head housing 108-2 via the second sensor head housing inlet 110-2 and out of the second sensor head housing 108-2 via the second flow channel 105-2 for detection of smoke particles in the gas.

As illustrated in FIG. 1, the manifold 102 can further include a gasket 116. As used herein, the term "gasket" refers to a device located around an area of another device to make the area impervious to the transition of fluid through or around the device. For example, the gasket 116 can be located on a "back" side of the manifold 102 which is to interface (e.g., rest against) the PCB 112. The gasket 116 can fluidically seal the manifold 102 to the PCB 112, as is further described in connection with FIG. 2.

Figure 2:
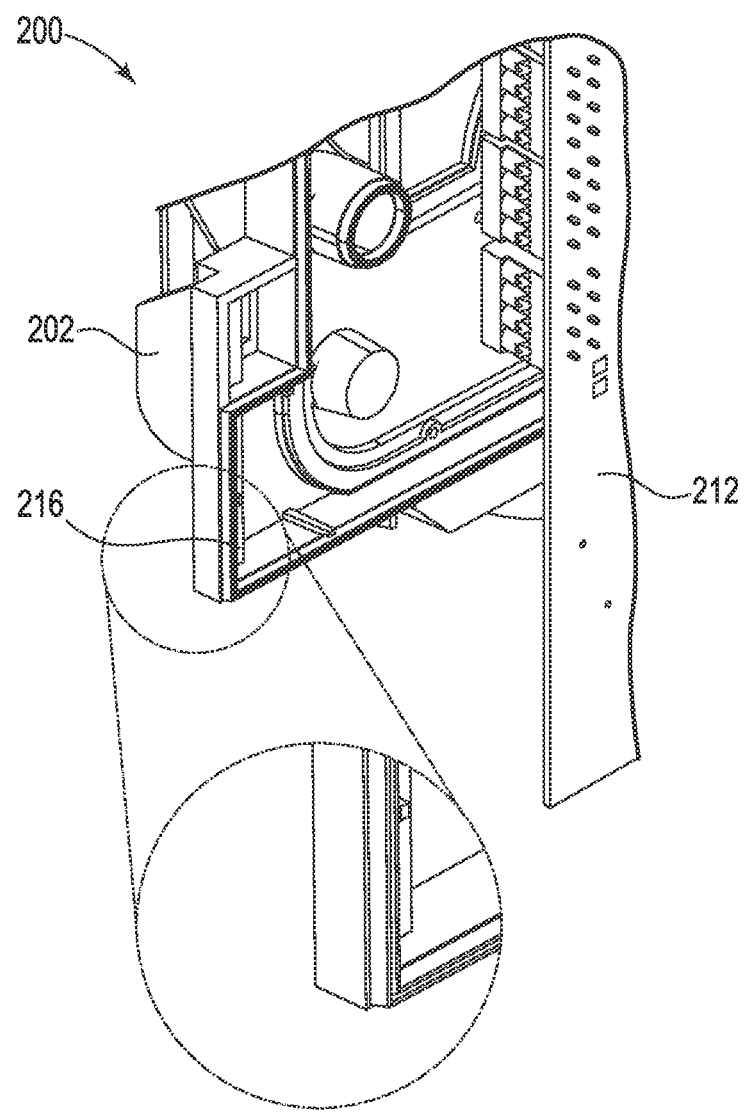
FIG. 2 is an exploded view of an example of a manifold and a printed circuit board (PCB) of an aspirating smoke detector device, in accordance with one or more embodiments of the present disclosure.

FIG. 2 is an exploded view of an example of a manifold 202 and a printed circuit board (PCB) 212 of an aspirating smoke detector device 200, in accordance with one or more embodiments of the present disclosure. The manifold 202 can include a gasket 216.

As previously described in connection with FIG. 1, the manifold 202 can include a gasket 216. The gasket 216 can be utilized to fluidically seal the manifold 202 to the PCB 212. For example, when the aspirating smoke detector device 200 is assembled, the manifold 202 can be positioned adjacent to (e.g., resting against) the PCB 212. When the manifold 202 is positioned adjacent to the PCB 212, the gasket 216 can be compressed against the PCB 212 to cause the gasket 216 to fluidically seal the manifold 202 to the PCB 212.

In some examples, the gasket 216 can be a thermo-plastic rubber gasket. The gasket 216 can be created on the manifold 202 via molding techniques, as is further described in connection with FIG. 10. Further, although the gasket 216 is described as a thermo-plastic rubber gasket, embodiments of the present disclosure are not so limited. For example, the gasket 216 can be any other material that can fluidically seal the manifold 202 to the PCB 212.

Fluidically sealing the manifold 202 to the PCB 212 can prevent substances from transiting between the gasket 216 into a space between the manifold 202 and the PCB 212. Such a fluidically sealed space can prevent moisture from entering the space. Accordingly, the gasket 216 can guard against moisture interacting with the PCB 212, preventing shorting of the electrical components of the PCB 212, preventing corrosion of the PCB 212, etc.

Figure 3:
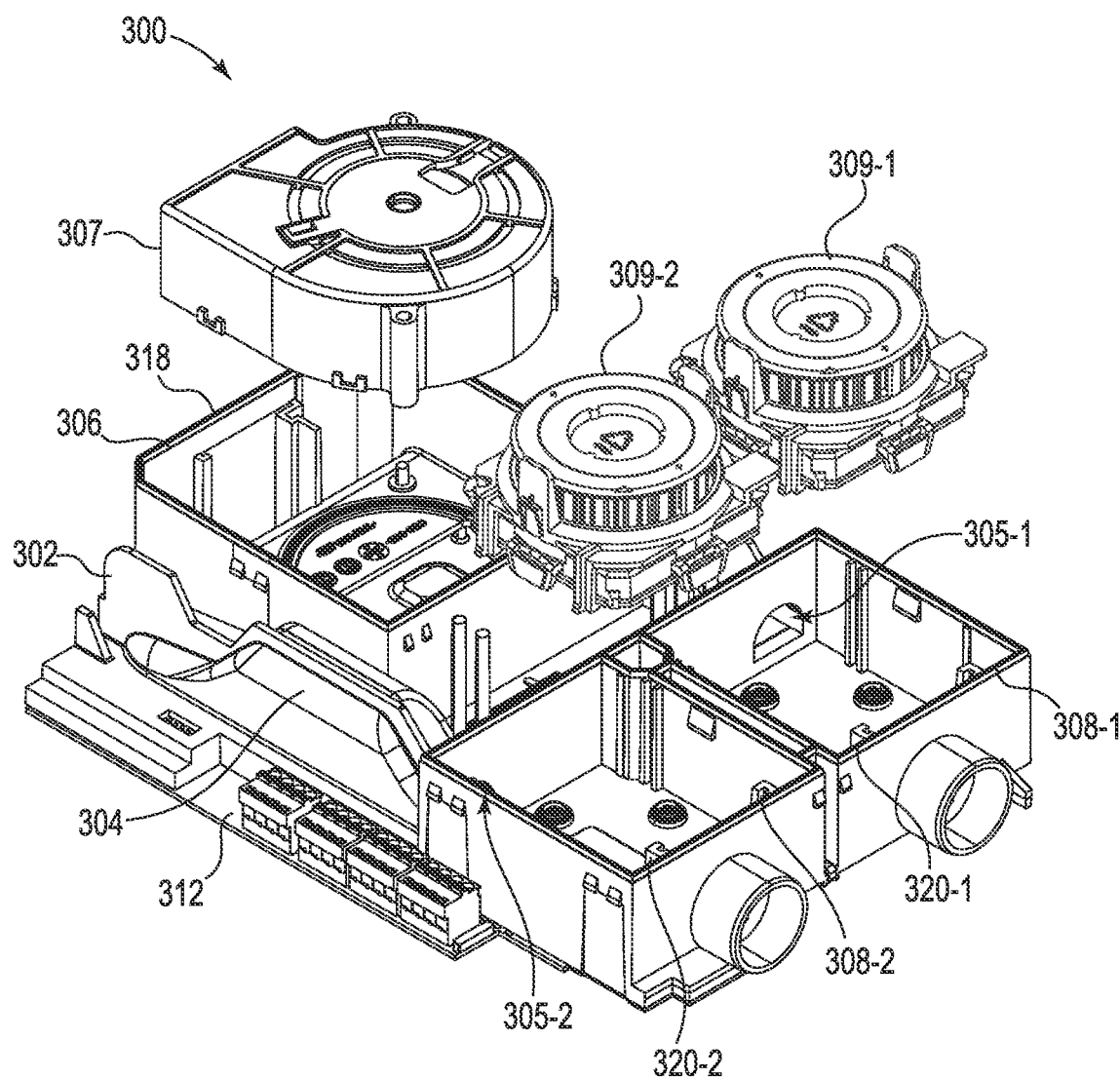
FIG. 3 is an exploded view of an example of a manifold, a blower, and sensor heads of an aspirating smoke detector device, in accordance with one or more embodiments of the present disclosure.

FIG. 3 is an exploded view of an example of a manifold 302, a blower 307, and sensor heads 309 of an aspirating smoke detector device 300, in accordance with one or more embodiments of the present disclosure. The aspirating smoke detector device 300 can include a manifold 302.

As previously described in connection with FIG. 1, the aspirating smoke detector device 300 can include a manifold 302, the manifold including a flow path 304, a blower housing 306, a first sensor head housing 308-1, and a second sensor head housing 308-2. The manifold 302 can cover the PCB 312. The flow path 304 can include the first flow channel 305-1 and the second flow channel 305-2.

As illustrated in FIG. 3, the manifold 302 can include the blower housing 306. The blower housing 306 is configured to receive the blower 307. As used herein, the term "blower" refers to a mechanical device for moving gas in a particular direction. For example, the blower 307 can be utilized to move gas through the aspirating smoke detector device 300. The blower 307 can, in some instances, comprise a ducted housing having a fan that, when spinning, causes gas (e.g., such as air) to flow in a particular direction.

The blower housing 306 is configured to receive the blower 307 when the blower 307 is oriented in a particular configuration. For example, the blower housing 306 can be designed such that the blower 307 can fit into the blower housing 306 in a single orientation. This can prevent the blower 307 from being installed in the blower housing 306 in an incorrect orientation.

The blower housing 306 can include a blower cover gasket 318. The blower cover gasket 318 can be formed on the blower housing 306 by, for instance, molding techniques. The blower cover gasket 318 can be, for example, a thermoplastic rubber gasket, among other examples.

The manifold 302 can additionally include the first sensor head housing 308-1. The first sensor head housing 308-1 can be connected to the blower housing 306 via the first flow channel 305-1 and can receive a first sensor head 309-1. As used herein, the term "sensor head" refers to a device to detect events and/or changes in its environment and transmit the detected events and/or changes for processing and/or analysis. For example, the sensor heads 309 can be utilized to detect smoke particles in gas transiting through the aspirating smoke detector device 300. In some examples, the first sensor head 309-1 can be a nephelometer (e.g., an aerosol photometer) to measure the concentration of smoke particles in a gas by utilizing light scattered by smoke particles. However, the first sensor head 309-1 can be any other type of smoke detection sensor that detects smoke utilizing gas transiting through the aspirating smoke detector device 300.

The first sensor head housing 308-1 can be configured to receive a first sensor head 309-1. That is, the first sensor head housing 308-1 is configured to receive the first sensor head 309-1 when the first sensor head 309-1 is oriented in a particular configuration. For example, the first sensor head housing 308-1 can be designed such that the first sensor head 309-1 can fit into the first sensor head housing 308-1 in a single orientation. This can prevent the first sensor head 309-1 from being installed in the first sensor head housing 308-1 in an incorrect orientation.

The first sensor head housing 308-1 can include a first sensor head housing cover gasket 320-1. The first sensor head housing cover gasket 320-1 can be formed on the first sensor head housing 308-1 by, for instance, molding techniques. The first sensor head housing cover gasket 320-1 can be, for example, a thermoplastic rubber gasket, among other examples.

Similar to the first sensor head housing 308-1, the second sensor head housing 308-2 can be connected to the blower housing 306 via the second flow channel 305-2 and can receive a second sensor head 309-2. The second sensor head 309-2 can be a nephelometer or any other type of smoke detection sensor that detects smoke utilizing gas transiting through the aspirating smoke detector device 300. Additionally, the second sensor head housing 308-2 can be configured to receive the second sensor head 309-2. That is, the second sensor head housing 308-2 is configured to receive the second sensor head 309-2 when the second sensor head 309-2 is oriented in a particular configuration. For example, the second sensor head housing 308-2 can be designed such that the second sensor head 309-2 can fit into the second sensor head housing 308-2 in a single orientation. This can prevent the second sensor head 309-2 from being installed in the second sensor head housing 308-2 in an incorrect orientation.

The second sensor head housing 308-2 can include a second sensor head housing cover gasket 320-2. The second sensor head housing cover gasket 320-2 can be formed on the second sensor head housing 308-2 by, for instance, molding techniques. The second sensor head housing cover gasket 320-2 can be, for example, a thermoplastic rubber gasket, among other examples.

Figure 4:
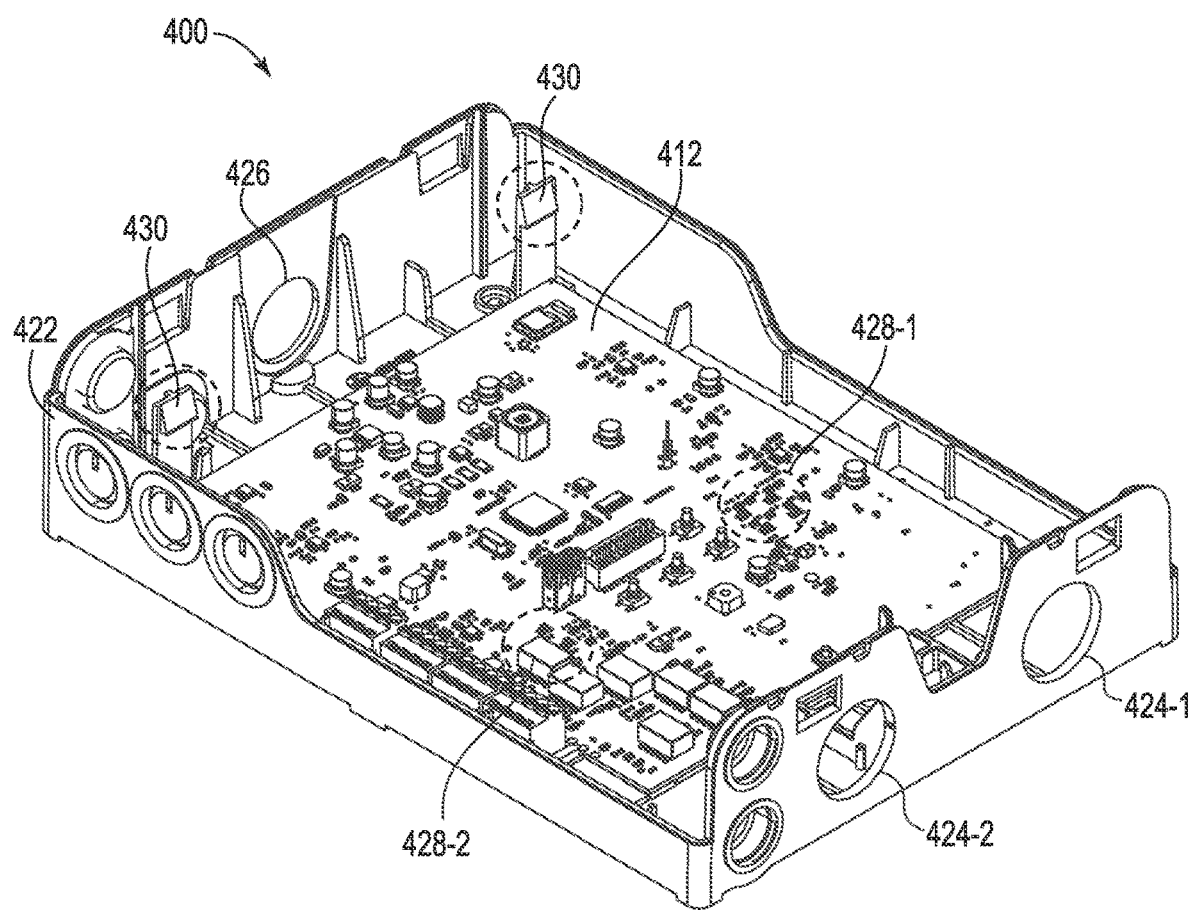
FIG. 4 is perspective view of an example of a housing and a PCB of an aspirating smoke detector device, in accordance with one or more embodiments of the present disclosure.

FIG. 4 is perspective view of an example of a housing 422 and a PCB 412 of an aspirating smoke detector device 400, in accordance with one or more embodiments of the present disclosure. The housing 422 can house the PCB 412, as is further described herein.

As illustrated in FIG. 4, the aspirating smoke detector device 400 can include a housing 422. As used herein, the term "housing" refers to an outer shell of a device. The housing 422 can be a "rear" housing of the aspirating smoke detector device 400 which can house the PCB 412. For example, the housing 422 can retain the PCB 412 after assembly of the aspirating smoke detector device 400. The PCB 412 can include LEDs 428-1 and 428-2. The LEDs 428-1 can be in a 2×2 array configuration to correspond with the 2×2 array configuration of the light pipes (e.g., light pipes 114-1, previously described in connection with FIG. 1) and the LEDs 428-2 can be in a 2×1 array configuration to correspond with the 2×1 array configuration of the light pipes (e.g., light pipes 114-2, previously described in connection with FIG. 1).

Although not illustrated in FIG. 4 for clarity and so as not to obscure embodiments of the present disclosure, the housing 422 can include a fastening mechanism. The fastening mechanism can retain the PCB 412 in the housing 422. The fastening mechanism can be, for example, a clamp(s), a snap clip, a mechanical fastener (e.g., a bolt, screw, etc.), among other types of fastening mechanisms.

Additionally, although not illustrated in FIG. 4 for clarity and so as not to obscure embodiments of the present disclosure, the housing 422 can include mounting locations. The mounting locations can include, for instance, a hole through which a fastener can secure the aspirating smoke detector device 400 to a wall or other object. The fastener can be secured to the wall or other object and slipped through the hole of the mounting location such that the housing 422 can rest on the fastener to mount the aspirating smoke detector device 400 to the wall or other object.

The housing 422 can include a first housing inlet 424-1, a second housing inlet 424-2, and a housing outlet 426. The first housing inlet 424-1, the second housing inlet 424-2, and the housing outlet 426 can be apertures in the structure of the housing 422. The first housing inlet 424-1 can receive a first sensor head housing inlet, the second housing inlet 424-2 can receive a second sensor head housing inlet, and the housing outlet 426 can receive a blower housing outlet, as is further described in connection with FIG. 5.

As illustrated in FIG. 4, the housing 422 can further include snap clips 430. As used herein, the term "snap clip" refers to a fastening mechanism including a protruding flange having an engagement tooth. The snap clips 430 can be deflected when an object to be secured is inserted adjacent to the snap clips 430 and an engagement tooth of each of the snap clips can engage with a surface of the object to secure the object, as is further described in connection with FIG. 5.

Figure 5:
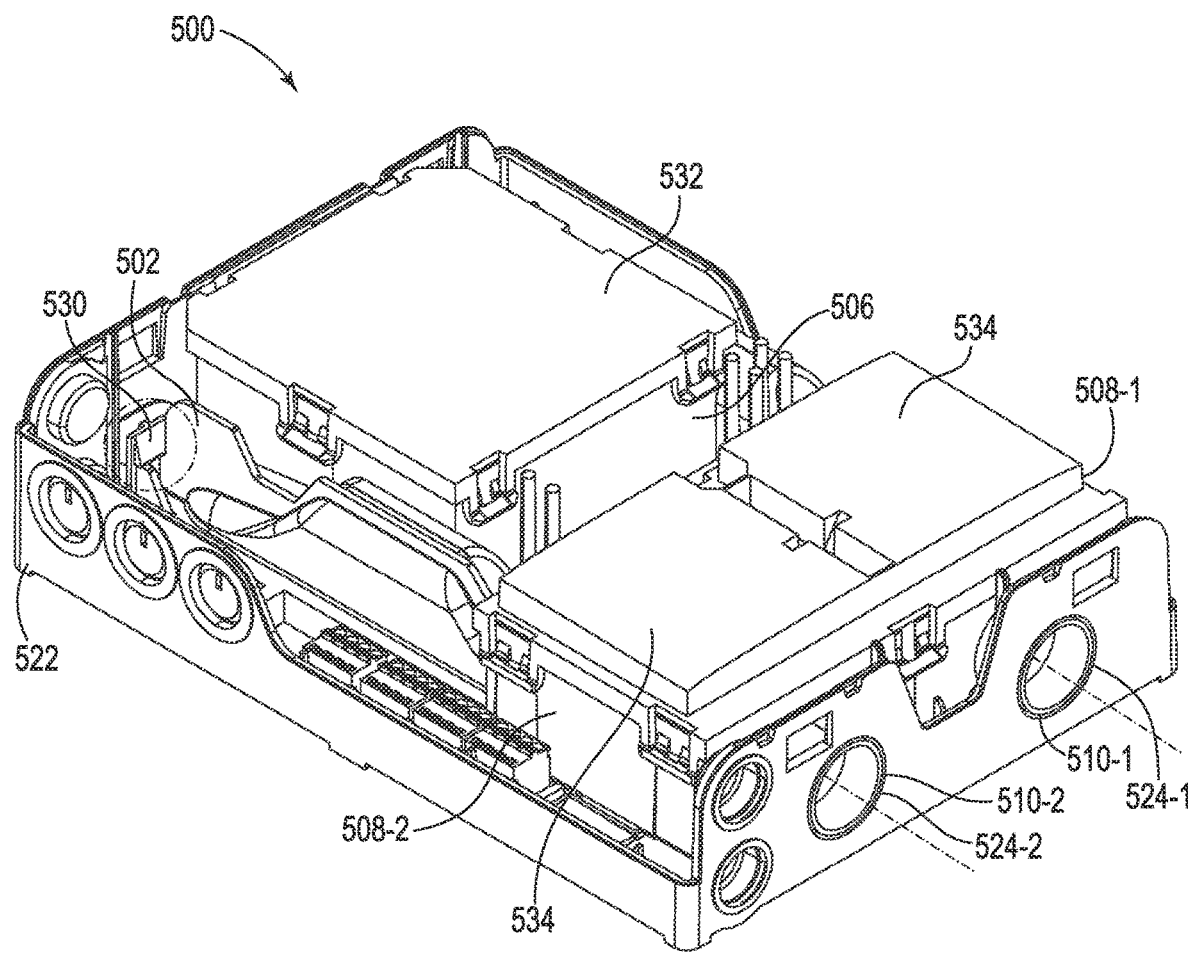
FIG. 5 is a perspective view of an example of a housing and a manifold of an aspirating smoke detector device having a blower housing cover and a sensor head housing cover, in accordance with one or more embodiments of the present disclosure.

FIG. 5 is a perspective view of an example of a housing 522 and a manifold 502 of an aspirating smoke detector device 500 having a blower housing cover 532 and a sensor head housing cover 534, in accordance with one or more embodiments of the present disclosure. The manifold 502 can include a blower housing 506 and sensor head housings 508.

In the embodiment illustrated in FIG. 5, the aspirating smoke detector device 500 can be partially assembled. For example, the manifold 502 can be connected to the housing 522 via a snap clip (e.g., snap clip 430, previously described in connection with FIG. 4). The snap clip can be deflected when the manifold 502 is inserted into the housing 522 and an engagement tooth of the snap clip can engage with a surface of the manifold 502 to connect the manifold 502 to the housing 522.

When the manifold 502 is connected to the housing 522, the first sensor head housing inlet 510-1 can be coaxially located with the first housing inlet 524-1. Additionally, the second sensor head housing inlet 510-2 can be coaxially located with the second housing inlet 524-2. Further, although not illustrated in FIG. 5 for clarity and so as not to obscure embodiments of the present disclosure, a blower housing outlet (e.g., blower housing outlet 636, as is further described in connection with FIG. 6) can be coaxially located with the housing outlet (e.g., housing outlet 426, previously described in connection with FIG. 4). Accordingly, gas can flow into the aspirating smoke detector device 500 via the first sensor head housing inlet 510-1 and/or the second sensor head housing inlet 510-2, to the sensor heads located in the sensor head housings 508, through the flow channels, and out the blower housing outlet, during which time the sensor heads can determine whether the gas includes smoke particles.

In order to ensure the gas flowing through the aspirating smoke detector device 500 is not mixed with gas located outside the aspirating smoke detector device 500, the various housings comprising the manifold 502 can be fluidically sealed. For example, the blower housing 506 can receive a blower housing cover 532. As previously described in connection with FIG. 3, the blower housing 506 can include a cover gasket (e.g., blower cover gasket 318, previously described in connection with FIG. 3). When the blower housing cover 532 is connected to the blower housing 506, the blower cover gasket can fluidically seal the blower housing 506 to the blower housing cover 532.

Similar to the blower housing 506, the first sensor head housing 508-1 and the second sensor head housing 508-2 can receive a sensor head housing cover 534 to cover the first sensor head and the second sensor head respectively located therein. As previously described in connection with FIG. 3, the first sensor head housing 508-1 and the second sensor head housing 508-2 can include a cover gasket (e.g., first sensor head housing cover gasket 320-1, previously described in connection with FIG. 3). When the sensor head housing cover 534 is connected to the first sensor head housing 508-1 and the second sensor head housing 508-2, the sensor head housing cover gasket can fluidically seal the first sensor head housing 508-1 and the second sensor head housing 508-2 to the sensor head housing cover 534.

Figure 6:
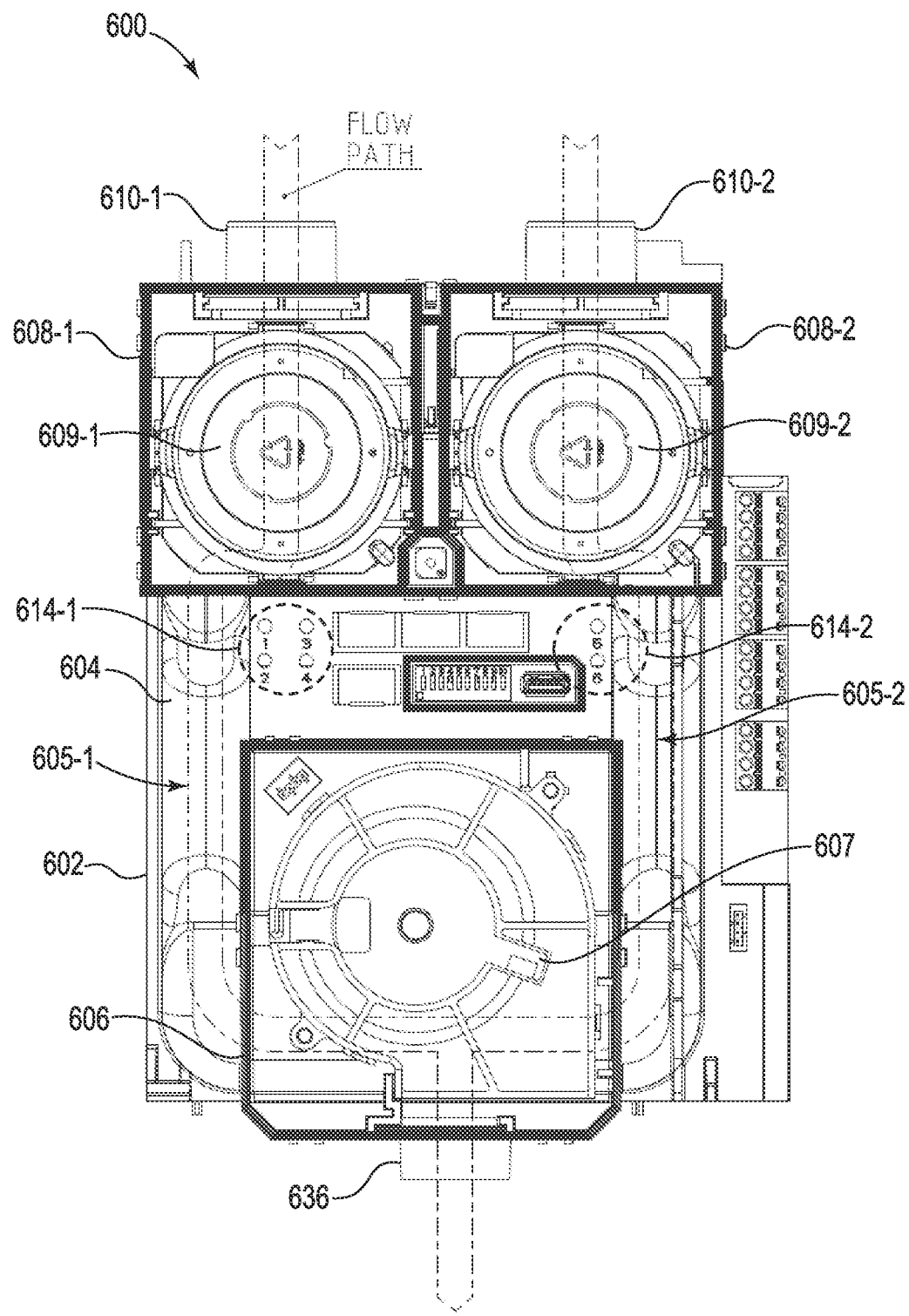
FIG. 6 is a front view of an example of a manifold of an aspirating smoke detector device having flow channels, in accordance with one or more embodiments of the present disclosure.

FIG. 6 is a front view of an example of a manifold 602 of an aspirating smoke detector device 600 having flow channels 605, in accordance with one or more embodiments of the present disclosure. The manifold 602 can include a first sensor head housing 608-1, a second sensor head housing 608-2, and a blower housing 606. The first sensor head housing 608-1 can include a first sensor head 609-1 and a first sensor head housing inlet 610-1. The second sensor head housing 608-2 can include a second sensor head 609-2 and a second sensor head housing inlet 610-2. The blower housing 606 can include a blower 607.

When the blower 607 is operating, gas can flow through the aspirating smoke detector device 600 as indicated in FIG. 6. Gas (e.g., such as air from a space in a facility) can enter the aspirating smoke detector device 600 via the first sensor head housing inlet 610-1 and/or the second sensor head housing inlet 610-2 for smoke particle detection by the first sensor head 609-1 located in the first sensor head housing 608-1 and/or the second sensor head 609-2 located in the second sensor head housing 608-2. Following smoke particle detection by the first sensor head 609-1 and/or the second sensor head 609-2, the gas can travel through the first flow channel 605-1 and/or the second flow channel 605-2 and exit the aspirating smoke detector device 600 via the blower housing outlet 636.

As previously described herein, the aspirating smoke detector device 600 can include a PCB. The PCB can include LEDs that can light up during operation of the aspirating smoke detector device 600 in order to indicate certain information about the operation of the aspirating smoke detector device 600. Further, as previously described herein, the manifold 602 can further include light pipes 614-1 (e.g., in the 2×2 array configuration) and 614-2 (e.g., in the 2×1 array configuration). The manifold 602 can be positioned over the PCB and cover a portion of the PCB such that the light pipes 614 are oriented above the LEDs included on the PCB. The light pipes 614 can be of a transparent material to allow for the light emitted by the LEDs to be transmitted through the light pipes 614 when a cover (e.g., cover 844, as is further described in connection with FIG. 8) is connected to the manifold 602. The light pipes 614 can be, for example, of a transparent acrylic material, although embodiments of the present disclosure are not so limited. Accordingly, the light emitted by the LED can be visible when the aspirating smoke detector device 600 is operational.

Figure 7:
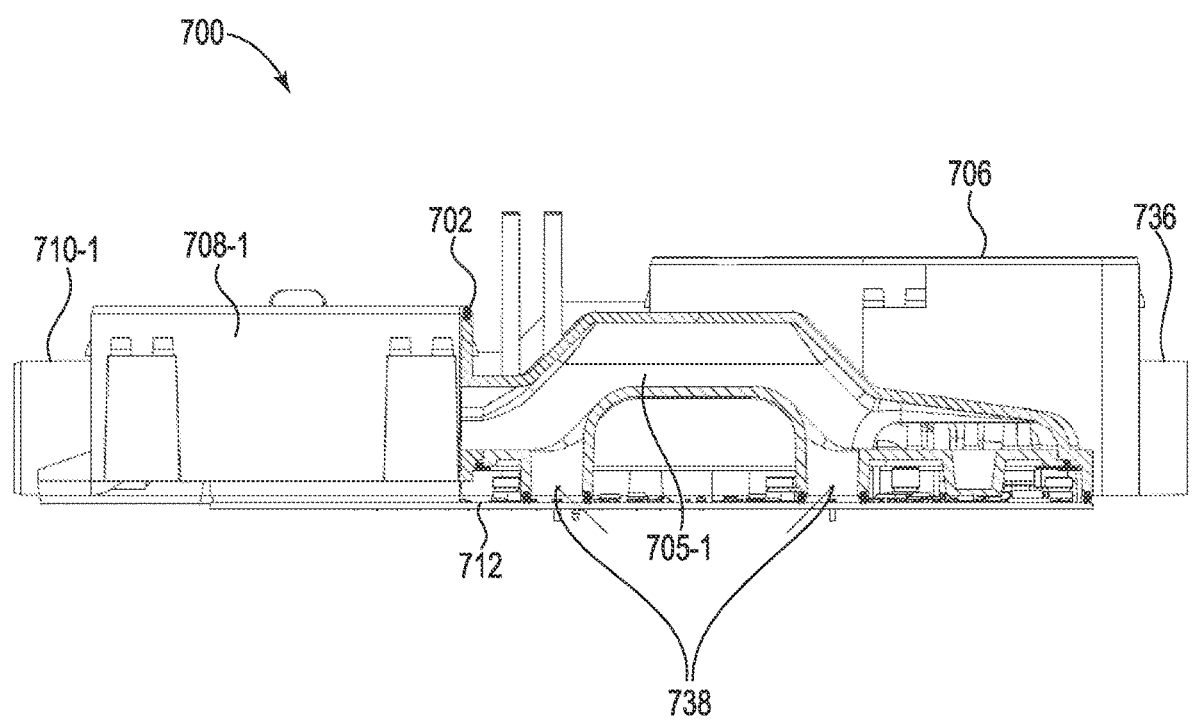
FIG. 7 is a side section view of an example of a manifold having a flow channel and a PCB having a pair of ultrasonic sensors, in accordance with one or more embodiments of the present disclosure.

FIG. 7 is a side section view of an example of a manifold 702 having a flow channel 705-1 and a PCB 712 having a pair of ultrasonic sensors 738, in accordance with one or more embodiments of the present disclosure. The manifold 702 can include a first sensor head housing 708-1, and a blower housing 706.

The first sensor head housing 708-1 can be fluidically connected to the blower housing 706 via the first flow channel 705-1. Further, although not illustrated in FIG. 7 for clarity and so as not to obscure embodiments of the present disclosure, the second sensor head housing (e.g., second sensor head housing 108-2, 308-2, 508-2, and 608-2, previously described in connection with FIGS. 1, 3, 5, and 6, respectively) can be fluidically connected to the blower housing 706 via a second flow channel (e.g., second flow channel 105-2, 305-2, 605-2, previously described in connection with FIGS. 1, 3, and 6, respectively).

The first flow channel 705-1 and the second flow channel can include constant cross-sectional dimensions. For example, the first flow channel 705-1 and the second flow channel can include constant cross-sectional dimensions (e.g., a constant radius/constant diameter) through a length of the first flow channel 705-1 and the second flow channel. The constant cross-sectional dimensions of the first flow channel 705-1 and the second flow channel can help to reduce speed variation and distribution in the flow of the gas through the first flow channel 705-1 and the second flow channel, which can help to increase performance of the blower included in the blower housing 706, as compared with previous approaches.

The PCB 712 can include a pair of ultrasonic sensors 738 exposed in the first flow channel 705-1. Further, although not illustrated in FIG. 7 for clarity and so as not to obscure embodiments of the present disclosure, the PCB 712 can include another pair of ultrasonic sensors exposed in a similar location in the second flow channel as the pair of ultrasonic sensors 738 in the first flow channel 705-1. As used herein, the term "ultrasonic sensor" refers to an electronic component used for measuring the time needed by ultrasonic waves to cover a distance between the sensor and a target, where the target can be another ultrasonic sensor. Using the time of travel (forward and backward) between the pair of ultrasonic sensors, a flow rate of a gas can be measured flowing through the aspirating smoke detector device 700.

The pair of ultrasonic sensors 738 allow for measurement of a gas flow rate of the gas through the aspirating smoke detector device 700. Measuring the gas flow rate of the gas through the aspirating smoke detector device 700 via the pair of ultrasonic sensors 738 can allow for calibration of the blower, as well as ensuring a constant air flow through the aspirating smoke detector device 700.

Figure 8:
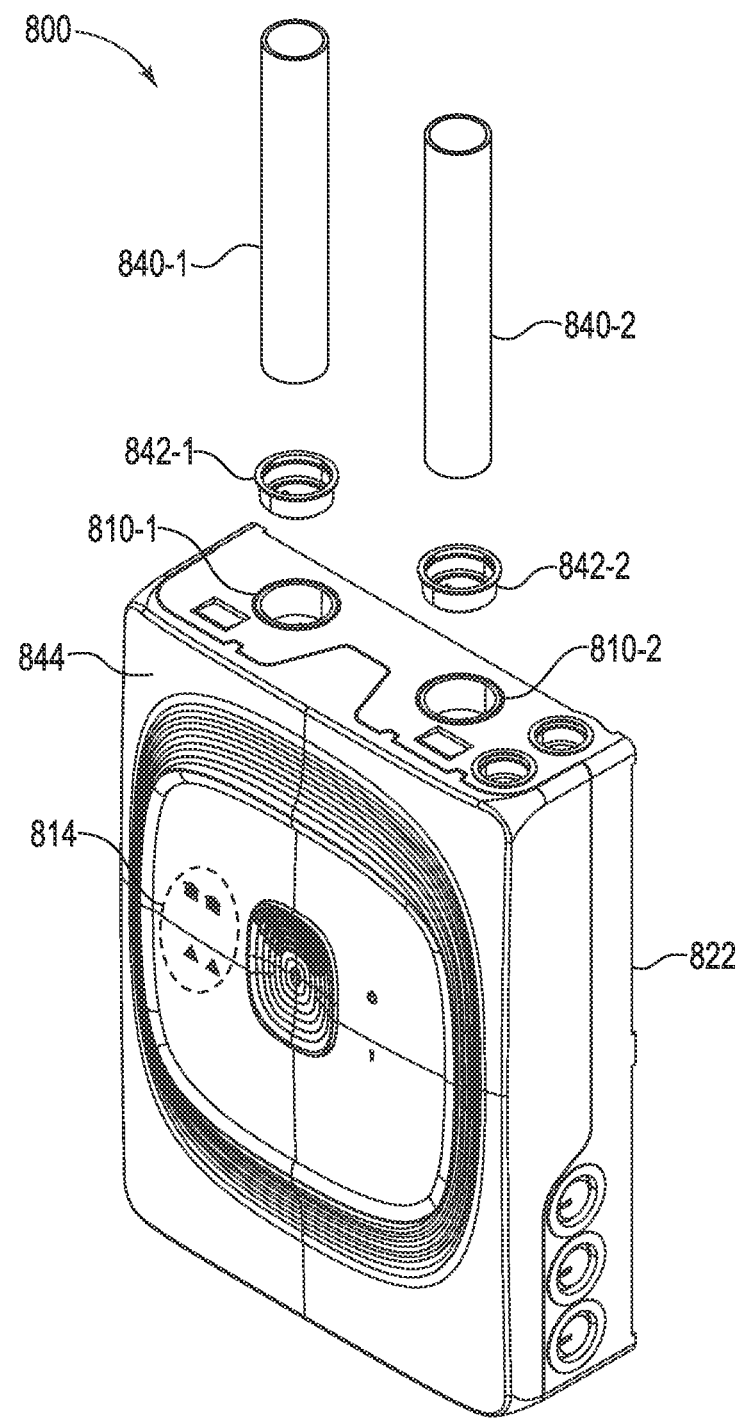
FIG. 8 is an exploded perspective view of an example of an aspirating smoke detector device having inlet pipes, in accordance with one or more embodiments of the present disclosure.

FIG. 8 is an exploded perspective view of an example of an aspirating smoke detector device 800 having inlet pipes 840, in accordance with one or more embodiments of the present disclosure. The aspirating smoke detector device 800 can include a housing 822 and a cover 844.

As illustrated in FIG. 8, the aspirating smoke detector device 800 can be nearly fully assembled. The cover 844 (e.g., a "front" cover) can be connected to the housing 822 via snap clip(s). When the cover 844 is connected to the housing 822, the light pipes 814 allow for illumination from the LEDs included on a PCB in the aspirating smoke detector device 800 to be seen when the aspirating smoke detector device 800 is assembled.

The first housing inlet 824-1 can be connected to a first inlet pipe 840-1 via a first inlet adapter 842-1. Additionally, the second housing inlet 824-2 can be connected to a second inlet pipe 840-2 via a second inlet adapter 842-2. For example, when installed, the aspirating smoke detector device 800 can draw gas from a location in a facility through a piping network to the aspirating smoke detector device 800 for smoke detection. The piping network can include the first inlet pipe 840-1 and/or the second inlet pipe 840-2, which can be connected to the aspirating smoke detector device 800 via the first inlet adapter 842-1 and/or the second inlet adapter 842-2, respectively.

The first inlet adapter 842-1 and the second inlet adapter 842-2 can be "breakable". If the first inlet pipe 840-1 and the second inlet pipe 840-2 are 25 millimeter (mm) diameter pipes, the first inlet adapter 842-1 and the second inlet adapter 842-2 can be used to accommodate the 25 mm inlet pipes 840. If the first inlet pipe 840-1 and the second inlet pipe 840-2 are 27 mm diameter pipes, the inlet adapters 842 can be removed to accommodate the 27 mm inlet pipes 840. The first inlet adapter 842-1 and the second inlet adapter 842-2 can accordingly allow for the accommodation of differently sized piping networks which may vary based on different facilities, different jurisdictions, etc., allowing for ease of installation in different facilities in different locations. As such, the first inlet adapter 842-1 can fluidically seal the first inlet pipe 840-1 and the first sensor head housing inlet 810-1 and the second inlet adapter 842-2 can fluidically seal the second inlet pipe 840-2 and the second sensor head housing inlet 810-2.

Figure 9A:
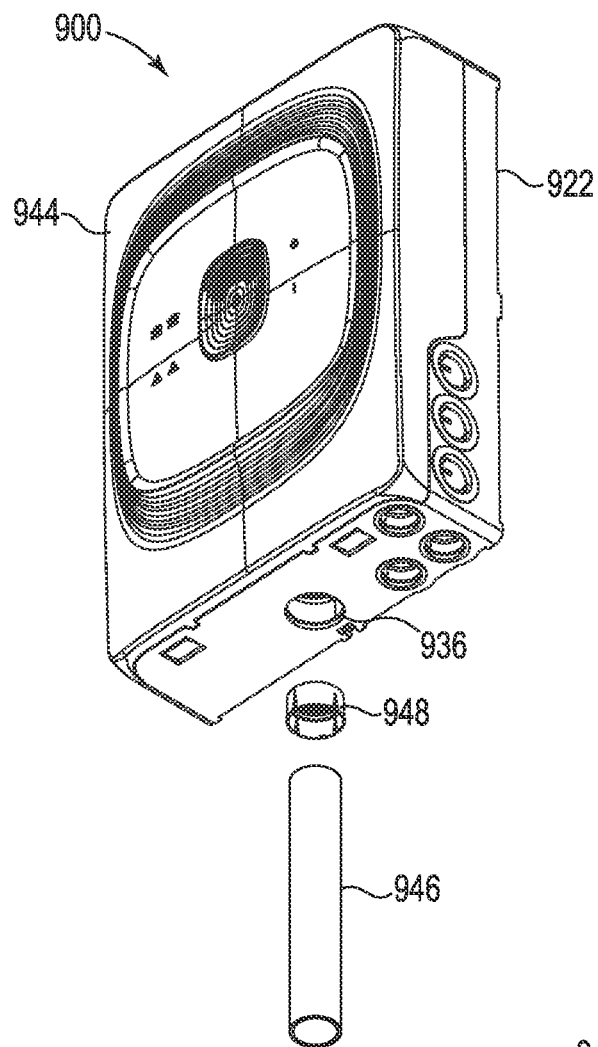
FIG. 9A is an exploded perspective view of an example of an aspirating smoke detector device having an exhaust pipe and an outlet adapter, in accordance with one or more embodiments of the present disclosure.

FIG. 9A is an exploded perspective view of an example of an aspirating smoke detector device 900 having an exhaust pipe 946 and an outlet adapter 948, in accordance with one or more embodiments of the present disclosure. The aspirating smoke detector device 900 can include the cover 944 connected to the housing 922.

As illustrated in FIG. 9A, the blower housing outlet 936 can be connected to an exhaust pipe 946 via an outlet adapter 948. The gas exiting the aspirating smoke detector device 900 can do so through the exhaust pipe 946.

As illustrated in FIG. 9A, the outlet adapter 948 can be oriented to receive the exhaust pipe 946. That is, the exhaust pipe 946 can be connected to the outlet adapter 948 by inserting the exhaust pipe 946 into the outlet adapter 948. A mesh screen included on the outlet adapter 948 can point "inwards" and prevent particulate or other objects from exiting or entering the aspirating smoke detector device 900 via the blower housing outlet 936.

Figure 9B:
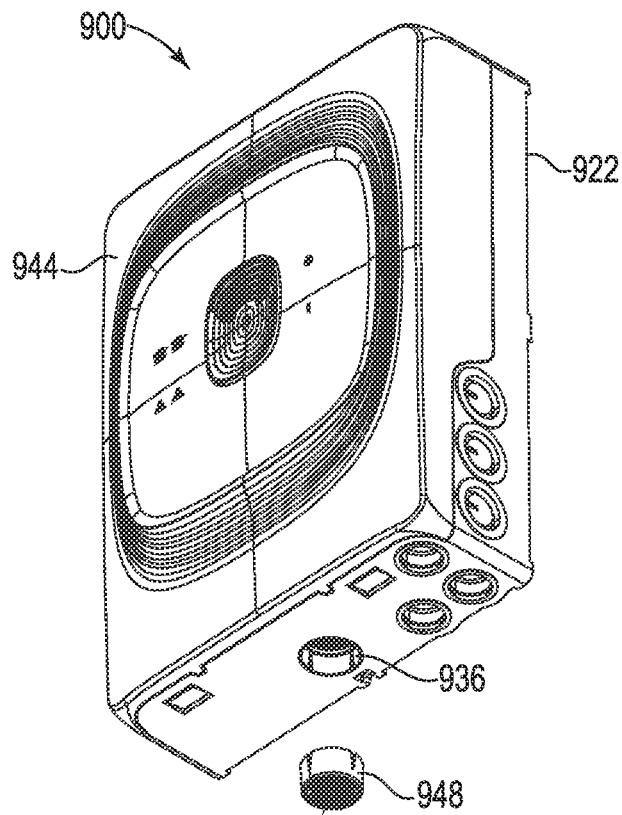
FIG. 9B is an exploded perspective view of an example of an aspirating smoke detector device having an outlet adapter, in accordance with one or more embodiments of the present disclosure.

FIG. 9B is an exploded perspective view of an example of an aspirating smoke detector device 900 having an outlet adapter 948, in accordance with one or more embodiments of the present disclosure. The aspirating smoke detector device 900 can include the cover 944 connected to the housing 922.

As illustrated in FIG. 9B, the blower housing outlet 936 can be connected to an outlet adapter 948. The gas exiting the aspirating smoke detector device 900 can do so through the outlet adapter 948.

The outlet adapter can be connected to the blower housing outlet 936 by inserting the outlet adapter 948 into the blower housing outlet 936. A mesh screen included on the outlet adapter 948 can point "outwards" and prevent particulate or other objects from exiting or entering the aspirating smoke detector device 900 via the blower housing outlet 936. In such a manner, the outlet adapter 948 can function as a mesh plug. The outlet adapter 948 can be oriented as illustrated in FIG. 9B in an embodiment in which the aspirating smoke detector device 900 is not connected to an exhaust pipe (e.g., exhaust pipe 946, previously described in connection with FIG. 9A).

Figure 10:
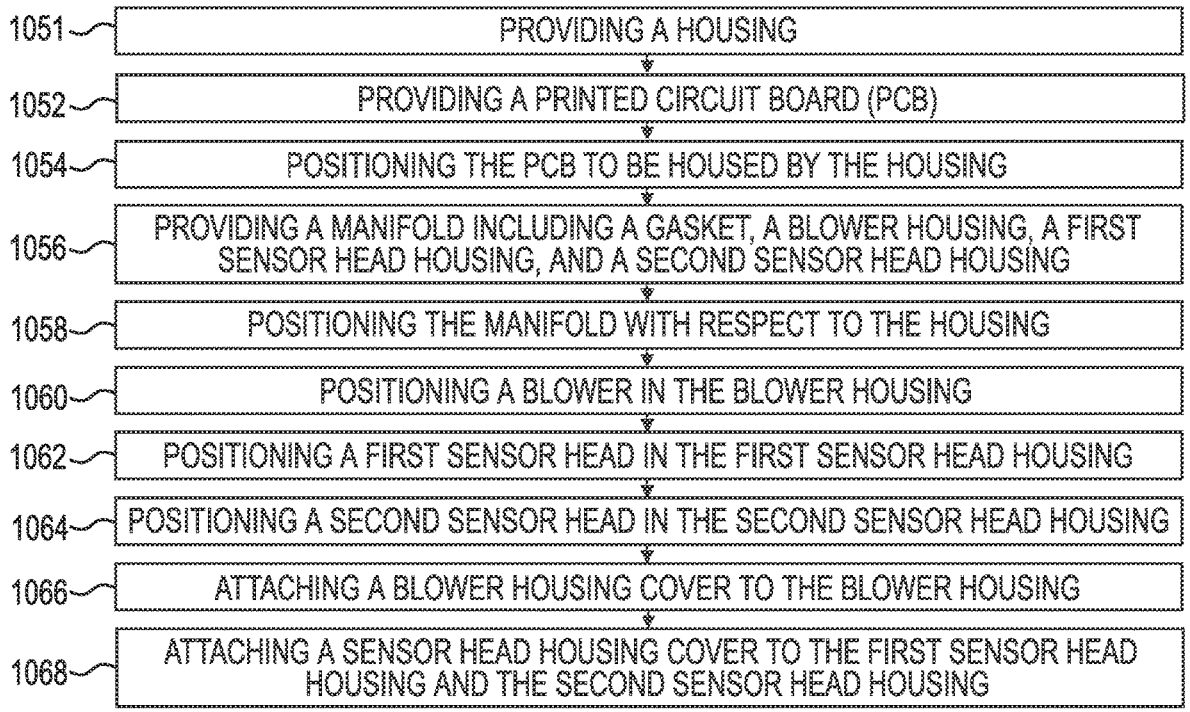
FIG. 10 is an example of a method of manufacturing of an aspirating smoke detector device, in accordance with one or more embodiments of the present disclosure.

FIG. 10 is an example of a method 1050 of manufacturing of an aspirating smoke detector device, in accordance with one or more embodiments of the present disclosure. At 1051, the method includes providing a housing. The housing can be a "rear" housing that can house a PCB and include snap clips to connect various parts of the aspirating smoke detector device thereto. The housing can be molded, cast, three-dimensionally (3D) printed, etc.

At 1052, the method 1050 includes providing a PCB. The PCB can include electrical components utilized in detection of smoke via the aspirating smoke detector device, such as LEDs, switches, buttons, pairs of ultrasonic sensors, as well as processing and memory resources, among other electrical components.

At 1052, the method includes positioning the PCB to be housed by the housing. For example, the PCB can be positioned and attached to the housing.

At 1056, the method 1050 includes providing a manifold including a gasket, a first flow channel and a second flow channel, a blower housing, a first sensor head housing, and a second sensor head housing. The manifold can be provided using multi-shot molding techniques. Multiple material types can be utilized in a single mold at one time, including ABS plastic, PMMA plastic, and TPE elastomers, among other materials, in order to provide the manifold. Further, the method 1050 can include an in-mold assembling procedure also in conjunction with ultrasonic welding directly in the single-shot molding tool to provide the manifold. Further, the method 1050 can include over-molding the gasket to the manifold, another gasket to the blower housing, and a further gasket to the first and second sensor head housings. The gaskets can be, for example, thermoplastic rubber gaskets, among other examples.

At 1058, the method 1050 includes positioning the manifold with respect to the housing. The manifold can be positioned with respect to the housing such that the gasket interfaces with and compresses against the PCB to fluidically seal the manifold to the PCB.

At 1060, the method 1050 includes positioning a blower in the blower housing. The blower housing can be shaped such that the blower has to be oriented in a particular configuration in order to be received by the blower housing. This can prevent the blower from being positioned/installed in the blower housing in an incorrect orientation and ensures the correct orientation of the blower in the blower housing.

At 1062, the method 1050 includes positioning a first sensor head in the first sensor head housing such that the first sensor head is secured in the first sensor head housing. The first sensor head housing can be shaped such that the first sensor head also has to be oriented in a particular configuration in order to be received by the first sensor head housing.

At 1064, the method 1050 includes positioning a second sensor head in the second sensor head housing such that the second sensor head is secured in the second sensor head housing. The second sensor head housing can be shaped such that the second sensor head also has to be oriented in a particular configuration in order to be received by the second sensor head housing.

At 1066, the method 1050 can include attaching a blower housing cover to the blower housing. The blower housing cover can fluidically seal, via the blower housing gasket, the blower housing in response to attaching the blower housing cover to the blower housing. Since the blower is not secured in the blower housing by a snap clip, the blower housing cover can secure the blower in the blower housing.

At 1068, the method 1050 can include attaching a sensor head housing cover to the first sensor head housing and the second sensor head housing. The sensor head housing cover can fluidically seal, via the first sensor head housing gasket and the second sensor head housing gasket, the first sensor head housing and the second sensor head housing.

Lastly, the method 1050 can include providing an additional "front" cover. The "front" cover can be attached to the "rear" cover to complete assembly of the aspirating smoke detector device.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combinations of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An aspirating smoke detector device, comprising:
 a printed circuit board (PCB);
 a manifold, including:
  a first flow channel and a second flow channel;
  a blower housing configured to receive a blower;
  a first sensor head housing connected to the blower housing via the first flow channel, wherein the first sensor head housing is configured to receive a first sensor head; and
  a second sensor head housing connected to the blower housing via the second flow channel, wherein the second sensor head housing is configured to receive a second sensor head; and
 a gasket configured to fluidically seal the manifold to the PCB.

2. The aspirating smoke detector device of claim 1, wherein the PCB includes:
 a first pair of ultrasonic sensors exposed in the first flow channel; and
 a second pair of ultrasonic sensors exposed in the second flow channel;
 wherein the first and the second pairs of ultrasonic sensors are configured to measure a gas flow rate of a gas through the aspirating smoke detector device.

3. The aspirating smoke detector device of claim 1, wherein the aspirating smoke detector device further includes a housing having a first housing inlet, a second housing inlet, and a housing outlet.

4. The aspirating smoke detector device of claim 3, wherein:

the first sensor head housing includes a first sensor head housing inlet that is coaxial with the first housing inlet; and the second sensor head housing includes a second sensor head housing inlet that is coaxial with the second housing inlet.

5. The aspirating smoke detector device of claim 3, wherein:
the first housing inlet is connected to a first inlet pipe via a first inlet adapter; and
the second housing inlet is connected to a second inlet pipe via a second inlet adapter;
wherein the first inlet adapter is to fluidically seal the first inlet pipe and the first housing inlet and the second inlet adapter is to fluidically seal the second inlet pipe and the second housing inlet.

6. The aspirating smoke detector device of claim 3, wherein the housing outlet is connected to an outlet adapter having a mesh filter.

7. The aspirating smoke detector device of claim 6, wherein the housing outlet is connected to an exhaust pipe via the outlet adapter, wherein the outlet adapter is oriented such that the outlet adapter is to receive the exhaust pipe.

8. The aspirating smoke detector device of claim 1, wherein the gasket is a thermoplastic-rubber gasket.

9. The aspirating smoke detector device of claim 1, wherein:
the PCB includes a light emitting diode (LED); and
the manifold further includes a light pipe.

10. The aspirating smoke detector device of claim 9, wherein the manifold is to cover a portion of the PCB such that the light pipe is oriented above the LED such that the LED is visible when a cover is connected to the manifold.

11. An aspirating smoke detector device, comprising:
a housing;
a printed circuit board (PCB) housed by the housing; and
a manifold to cover a first portion of the PCB, including:
a first flow channel and a second flow channel;
a blower housing, wherein the blower housing is configured to receive a blower;
a first sensor head housing connected to the blower housing via the first flow channel, wherein the first sensor head housing is configured to receive a first sensor head; and
a second sensor head housing connected to the blower housing via the second flow channel, wherein the second sensor head housing is configured to receive a second sensor head; and
a gasket configured to fluidically seal the manifold to the PCB.

12. The aspirating smoke detector device of claim 11, wherein:
the blower housing is configured to receive a blower housing cover to cover the blower; and
the blower housing includes a cover gasket to fluidically seal the blower housing to the blower housing cover.

13. The aspirating smoke detector device of claim 11, wherein:

the first sensor head housing and the second sensor head housing are configured to receive a sensor head housing cover to cover the first sensor head and the second sensor head; and
the first sensor head housing and the second sensor head housing include a cover gasket to fluidically seal the first sensor head housing and the second sensor head housing to the sensor head housing cover.

14. The aspirating smoke detector device of claim 11, wherein the first flow channel and the second flow channel have constant cross-sectional dimensions.

15. The aspirating smoke detector device of claim 11, wherein the manifold is connected to the housing via snap clips.

16. A method of manufacturing an aspirating smoke detector device, comprising:
providing a housing;
providing a printed circuit board (PCB);
positioning the PCB to be housed by the housing;
providing a manifold including a gasket, a blower housing, a first sensor head housing, and a second sensor head housing;
positioning the manifold with respect to the housing such that the gasket interfaces with and compresses against the PCB to fluidically seal the manifold to the PCB;
positioning:
a blower in the blower housing;
a first sensor head in the first sensor head housing such that the first sensor head is secured in the first sensor head housing; and
a second sensor head in the second sensor head housing such that the second sensor head is secured in the second sensor head housing; and
attaching:
a blower housing cover to the blower housing to secure the blower in the blower housing; and
a sensor head housing cover to the first sensor head housing and the second sensor head housing.

17. The method of claim 16, wherein:
providing the manifold further includes providing a further gasket on the blower housing; and
the blower housing cover is to interface with the further gasket to fluidically seal the blower housing.

18. The method of claim 16, wherein:
providing the manifold further includes providing a further gasket on the first sensor head housing and the second sensor head housing; and
the sensor head housing cover is to interface with the further gasket to fluidically seal the first sensor head housing and the second sensor head housing.

19. The method of claim 16, wherein the method includes providing the manifold using a multi-shot molding.

20. The method of claim 16, wherein the method includes providing an additional cover and attaching the additional cover to the housing.

* * * * *